US012670002B2

(12) United States Patent
Yuan et al.

(10) Patent No.: US 12,670,002 B2
(45) Date of Patent: Jun. 30, 2026

(54) SOURCE ARCHIVE OPTIMIZATIONS FOR REDUCING CONTAINER IMAGE SIZES

(71) Applicant: NVIDIA Corporation, Santa Clara, CA (US)

(72) Inventors: Feng Yuan, Shanghai City (CN); Kaustubh Purandare, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 580 days.

(21) Appl. No.: 17/416,921

(22) PCT Filed: Jun. 7, 2021

(86) PCT No.: PCT/CN2021/098672
§ 371 (c)(1),
(2) Date: Dec. 15, 2022

(87) PCT Pub. No.: WO2022/256980
PCT Pub. Date: Dec. 15, 2022

(65) Prior Publication Data
US 2024/0012663 A1      Jan. 11, 2024

(51) Int. Cl.
G06F 9/455 (2018.01)
H04L 67/02 (2022.01)
H04L 67/06 (2022.01)

(52) U.S. Cl.
CPC .......... G06F 9/45558 (2013.01); H04L 67/02 (2013.01); H04L 67/06 (2013.01);
(Continued)

(58) Field of Classification Search
CPC . G06F 2009/45562; G06F 2009/45595; G06F 9/45558; G06F 8/61; H04L 67/02; H04L 67/06; H05B 33/10
See application file for complete search history.

(56) References Cited

U.S. PATENT DOCUMENTS 8,386,731 B2 *   2/2013   Mashtizadeh ......... G06F 3/0647
                                                             718/1
9,766,945 B2 *   9/2017   Gaurav ................. G06F 9/4856
(Continued)

FOREIGN PATENT DOCUMENTS

CN        110413455 A      11/2019
CN        110704156 A       1/2020
(Continued)

OTHER PUBLICATIONS

NVIDIA Corporation; International Search Report and Written Opinion for PCT/CN2021/098672, filed Jun. 7, 2021, mailed Mar. 8, 2022, 8 pgs.

*Primary Examiner* — Peng Ke
(74) *Attorney, Agent, or Firm* — IRON SUMMIT IP LLP

(57) ABSTRACT

In various examples, source archives may be classified, sorted, downloaded, and installed using command files for container image generation. For example, a user may select source archives for inclusion in a container build operation, and the system may classify the source archives as belonging to one of any number of classes and/or sub-classes. Where a size of the source archive is below an associated threshold, the source archive may be included in the container image using native context copy operations. In contrast, where the size of the source archive is above the associated threshold, the source archive may be included in the container image using a local HTTP auto copy operation—e.g., by creating a local HTTP server, and generating a command line such that a container builder retrieves the archive information via the local HTTP server.

26 Claims, 14 Drawing Sheets

(52) U.S. Cl.
CPC .............. *G06F 2009/45562* (2013.01); *G06F*
*2009/45595* (2013.01)

(56) References Cited

U.S. PATENT DOCUMENTS

| 10,200,471 | B2 * | 2/2019 | Vasetsky ............. H04L 41/0895 |
| 10,768,973 | B1 * | 9/2020 | Jin ........................ G06F 16/178 |
| 10,929,117 | B2 | 2/2021 | Goldmann |
| 11,281,624 | B1 * | 3/2022 | Paterra ................ G06F 16/1827 |
| 2002/0099776 | A1 * | 7/2002 | Cafarella ............ H04L 65/1096 |
| | | | 709/206 |
| 2014/0013238 | A1 * | 1/2014 | Jin .......................... H04L 67/06 |
| | | | 715/748 |
| 2018/0285199 | A1 * | 10/2018 | Mitkar ................ G06F 11/2094 |
| 2019/0243628 | A1 | 8/2019 | Goldmann et al. |
| 2020/0218798 | A1 * | 7/2020 | Kosaka ................... G06F 9/451 |
| 2020/0225981 | A1 * | 7/2020 | Takahashi ............. G06F 9/4856 |
| 2021/0011885 | A1 | 1/2021 | Liu et al. |
| 2021/0141625 | A1 | 5/2021 | Goldmann et al. |
| 2021/0216583 | A1 | 7/2021 | Wu et al. |

FOREIGN PATENT DOCUMENTS

| CN | 111190687 A | 5/2020 |
| CN | 111324360 A | 6/2020 |

* cited by examiner

HTTP GROUP TEMPLATE 602
RUN \
{% for f in group %}
curl -SL {{ f.url }} && echo {{f.sum}}
{{f.name}} | md5sum -c && chmod
{{f.perm}} &&
{%endfor %}
&& {{group.postcmd}}

306

RUN curl -SL http://localhost/fileA && echo
abc123 fileA | md5sum -c && chmod 777 &&
curl -SL http://localhost/fileB && echo
abc321 fileB | md5sum -c && chmod 755 &&
cmdline

700

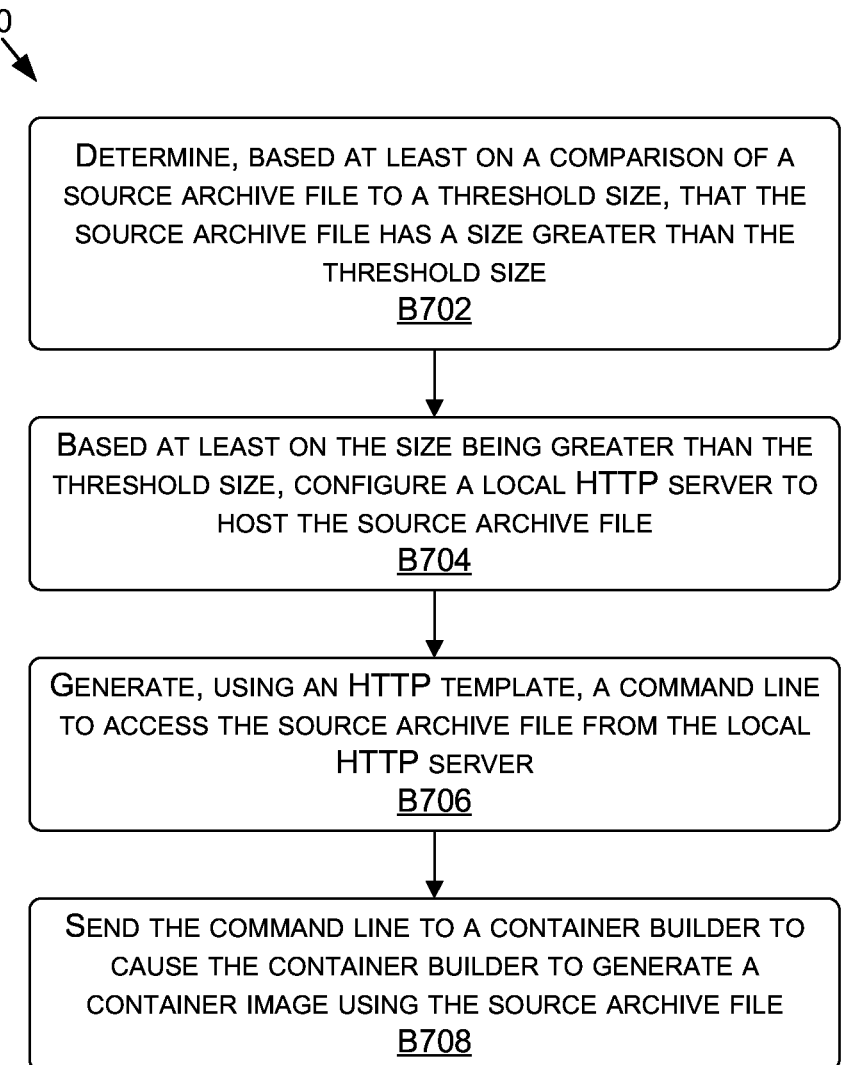

DETERMINE, BASED AT LEAST ON A COMPARISON OF A
SOURCE ARCHIVE FILE TO A THRESHOLD SIZE, THAT THE
SOURCE ARCHIVE FILE HAS A SIZE GREATER THAN THE
THRESHOLD SIZE
B702

BASED AT LEAST ON THE SIZE BEING GREATER THAN THE
THRESHOLD SIZE, CONFIGURE A LOCAL HTTP SERVER TO
HOST THE SOURCE ARCHIVE FILE
B704

GENERATE, USING AN HTTP TEMPLATE, A COMMAND LINE
TO ACCESS THE SOURCE ARCHIVE FILE FROM THE LOCAL
HTTP SERVER
B706

SEND THE COMMAND LINE TO A CONTAINER BUILDER TO
CAUSE THE CONTAINER BUILDER TO GENERATE A
CONTAINER IMAGE USING THE SOURCE ARCHIVE FILE
B708

SOURCE ARCHIVE OPTIMIZATIONS FOR REDUCING CONTAINER IMAGE SIZES

BACKGROUND

Containerization has become increasingly popular, at least in part, because containers allow for applications to be deployed using a standardized platform with low overhead. For example, due to the format of container images—e.g., including a layered structure—users are able to take advantage of pre-built or base images for many applications in an effort to reduce development time and more quickly deploy new software. However, due to the unique requirements or implementations of particular users, container images are often required to be highly customized. To customize these container images, users are conventionally required to hand-write low-level scripts (e.g., command files) and prepare full archives context. While installing information from source archives of different sources (e.g., local, remote HTTP, git, custom, etc.), users often encounter issues with container image sizes growing too large—e.g., making the container image hard to optimize due to internal mechanism restrictions. For example, for each source archive that is to be used, a separate copy command, run command, and/or post-processing command is required, each constituting its own layer in the final container image. Similarly, due to the custom nature of the container builds, and the requirement of handwritten scripts, building container images may be a long process that is not easily scalable to future archive changes. For example, when an archive is changed or updated, the user is required to write a new command line script for the updated archive, while making sure that the new command line is different from any cached command lines of cached layers to avoid improper use of previously built layers. As a result, container image building is a challenging task that takes a hands on approach from end-to-end—including scripting, debugging, and optimizing—while resulting in container images that are larger than necessary and thus not as efficient in operation.

SUMMARY

Embodiments of the present disclosure relate to classifying source archives for efficient downloading and installation into container images. Systems and methods are disclosed that automatically classify, sort, download, and install user-selected source archives from command files for container image generation. For example, rather than requiring a user handwrite low-level scripts (e.g., command files, such as a Dockerfile) and prepare full contexts of archives for container builds, a user may identify source archives, and the system may classify the source archives based on associated attributes and execute operations based on the associated classification for each source archive. Even though the process may take place automatically after source file selection, the intermediate processes may be made transparent to the user—e.g., via intermediate copy operations and/or HTTP auto copy operations using a local server. In this way, the user may verify the accuracy of the container build operation, while also increasing the scalability of the container build operation due to the automated processes executed by the system.

For example, a user may select source archives for inclusion in a container build operation—e.g. by updating a configuration file—and the system may classify the source archives as belonging to one of any number of classes (e.g., local archives, remote HTTP archives, Git archives, custom archives, etc.) and/or sub-classes (e.g., compressed, uncompressed, folder/directory, etc.). As such, where a source archive is a remote archive, an HTTP template may be used to generate a command line for downloading from the remote archive using an HTTP download, for example. Similarly, where the remote archive is a Git archive, or another archive type, the system may generate a command line for accessing and downloading the source archive information for inclusion in the container image. Where the source archive is local, a size of the source archive may be compared to one or more size thresholds based on the sub-class of the source file. For example, for local compressed archive sources, a first size threshold may be used, while for local uncompressed sources (e.g., files or folders), another, larger threshold may be used. When the size of the source archive is below an associated threshold, the source archive may be included in the container image using native context copy operations. When the size of the source archive is above an associated threshold, the source archive may be included in the container image using a local HTTP auto copy operation where a local HTTP server is created and a command line is used to cause a container builder to retrieve the archive information via the local server—e.g., similar to downloading from a remote archive. By creating a local server for source archive files greater than a threshold size, latency of the system may be reduced (e.g., due to less copy operations being executed) and container image sizes may be reduced (e.g., due to less layers—such as a copy layer—being required when compared to native copy operations that require both copy and run layers).

When a local HTTP auto copy operation is executed, information on access or modification permissions may be lost in the copy. To account for this, permissions information from the source archives undergoing the local HTTP auto copy operation may be retrieved, and an HTTP template may read the retrieved permissions information to include the permissions in the command line such that copied files include the same permissions as the original source file or folder. Similarly, when generating container images during a build, image layers may be cached for a next build of the container image. However, where source archives are updated or otherwise changed, reusing a cached layer corresponding to the updated source archive may result in an improper container image build—e.g., because the HTTP local download of the updated file may be skipped, and the wrong, cached file may be downloaded. To account for this, and because the determination to use a cached layer or not may be based on comparing a command line corresponding to a current layer and a cached layer, a checksum value (e.g., md5sum, sha25sum, etc.) may be included in the command line at each build such that updated files may have different command lines. For example, the HTTP template may be programmed to include a checksum value in the command line, and the command line for a current file and a cached file may then be compared—effectively comparing the checksum values—to determine whether to build a current image layer from the cache or from the HTTP local copy operation using the local source archive. To further decrease latency, and to remove the requirement for checksum generation at each build, a metadata file may be updated for the source archive—e.g., in a key-value format—such that a last update time and/or a file size stored in metadata may be compared against a current update time and/or file size to determine whether a change to the file has been made. Where no change has been made, computation of the checksum may be omitted—thereby preserving compute resources and decreasing runtime. In contrast, where a change has been made to the last update time and/or the file size, a new checksum value may be computed and included in the command line for comparison to the cached layer command line to determine whether to use the cached layer or to build a new layer using the updated or modified source archive. Similarly, to decrease complexity, the metadata file may include the last computed checksum value, the permissions info, and/or the file path such that the HTTP template may be filled from the metadata file alone. In embodiments, local source archives that include folders or directories—e.g., including multiple files therein—may be treated as a single file where each file within the folder or directory may be labeled as a group. As a result, rather than requiring that each file include a separate command line—and thus a separate layer in the final container image—a single command line may be used to access each of the files in the folder or directory, thereby reducing the file size of the container image when compared to conventional approaches.

BRIEF DESCRIPTION OF THE DRAWINGS

The present systems and methods for source archive optimizations for reducing container image sizes are described in detail below with reference to the attached drawing figures, wherein:

FIG. 7 illustrates a flow diagram for source archive layer generation for container images, in accordance with some embodiments of the present disclosure;

DETAILED DESCRIPTION

Systems and methods are disclosed related to source archive optimizations for reducing container image sizes.

The system and methods described herein may be used with any container builder software, and may be used within any application, system, architecture, or industry where containers may be implemented. For example, the systems and methods described herein may be used for development, deployment, on any operating system (OS), on virtual machines (VMs), on any computing device type, in a data center, in the cloud, locally, and/or the like. As such, the present systems and methods may improve the efficiency and effectiveness of container image builds and reduce the size of container images in any implementation of containers.

Figure 1A:
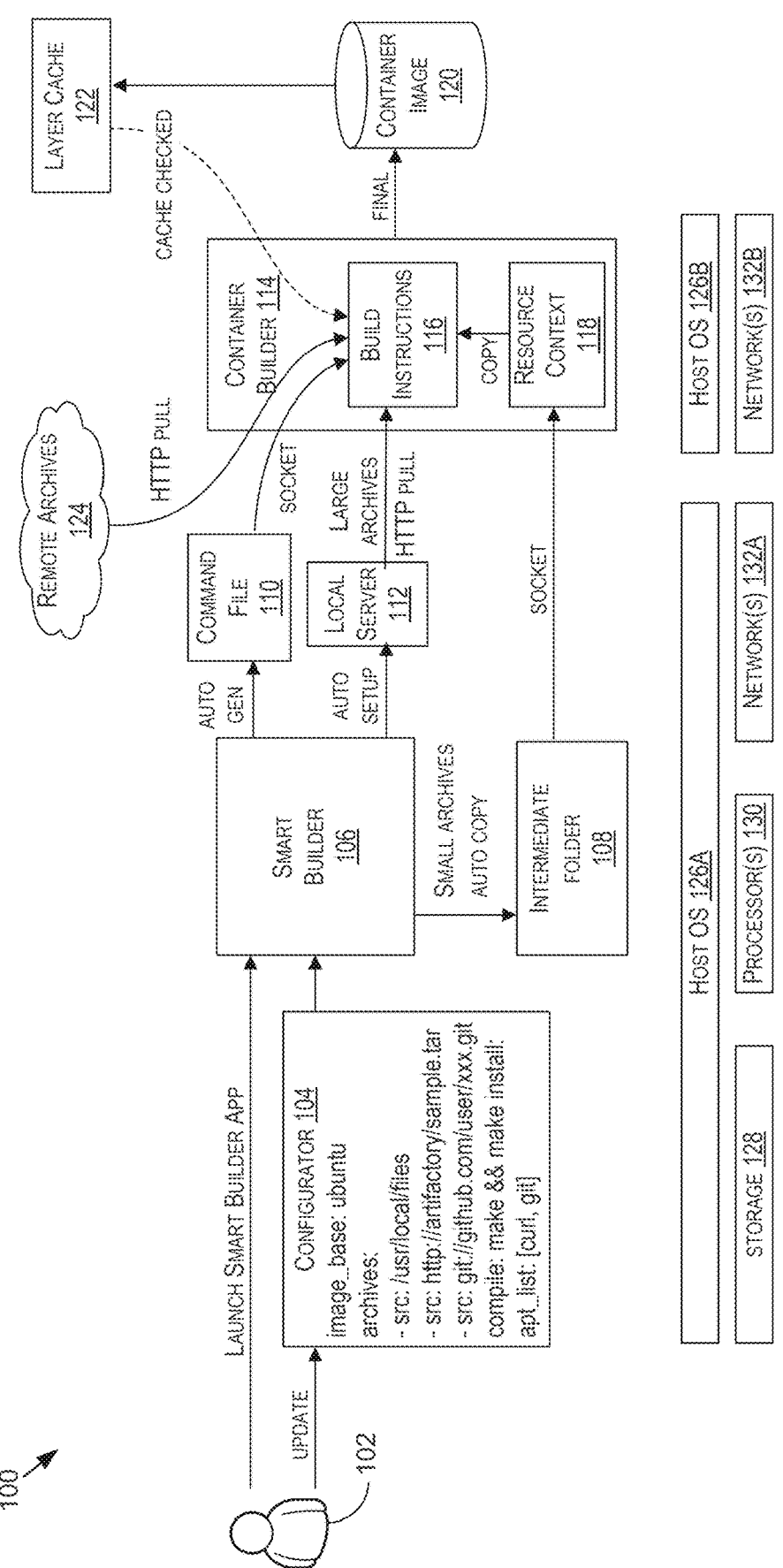
FIGS. 1A-1B illustrate example block diagrams for a container builder system, in accordance with some embodiments of the present disclosure.
Figure 1B:
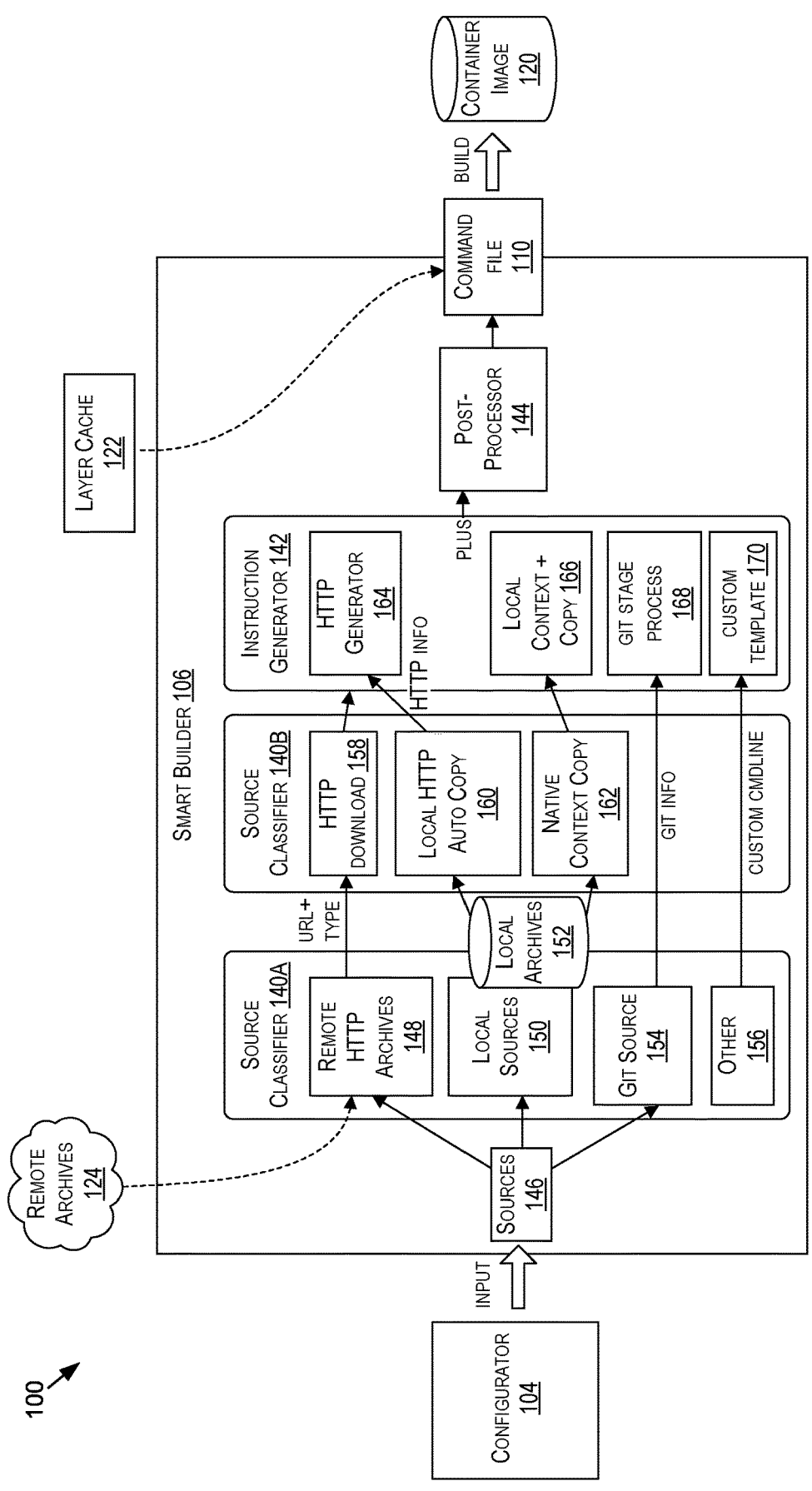

With reference to FIGS. 1A-1B, FIGS. 1A-1B illustrate an example container builder system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems and methods described herein may be implemented using similar components, features, and/or functionality to those of example computing device 800 of FIG. 8 and/or example data center 900 of FIG. 9.

As illustrated the system 100 may include one or more machines to generate a container image 120. For example, a single machine may execute smart builder 106 and container builder 114, or a first machine may execute the smart builder 106 and a second machine may execute the container builder 114. For example, a first host operating system (OS) 126A, a first storage 128, a first processor(s) 130, and/or a first network(s) may execute the smart builder 106, while a second host OS 126B, a second network(s) 132B, and so on may execute the container builder 114. The one or more machines may be local, remote, cloud-based, virtual, and/or a combination thereof. Although illustrated as two separate machines in FIG. 1A, this is not intended to be limiting, and the system 100 may include one or more virtual or discrete machines for generating a container image 120 using a smart builder 106.

With respect to FIG. 1A, a user 102 may select source archives—e.g., files, folders, directories, etc.—to include in a container image. For example, the user 102 may update a configuration (config) file for use by the configurator 104 that includes the source addresses for any number of different source archives. The source archives may be local source archives, remote source archives, Git source archives, custom source archives (e.g., URL/repo_name, from NVIDIA's NGC Registry, etc.), and/or the like. The user 102 may also launch an application for a smart builder 106 that is configured to help generate a command file 110, set up an intermediate folder 108 for local native copy operations, set up a local server 112 for local HTTP copy operations, and/or perform other operations, such as those described herein. As such, once the user 102 has launched the smart builder 106 and selected the source archives (e.g., added the source archive addresses to the config file), the smart builder 106 may—automatically in embodiments—use the config file and the configurator 104 to set up the source archives and the command files for use by a container builder 114.

With respect to FIG. 1B, once the source archives (or sources) 146 have been identified, a source classifier 140 (140A and 140B in FIG. 1B) may classify the sources 146 into their respective classes—such as remote HTTP archive class 148, a local sources class 150, a Git source class 154, or other source class 156. As such, once the sources are classified, different operations may be executed on the respective sources 146 to prepare command lines for the sources for inclusion in the command file 110 that may be used by a container builder 114 to build a container image 120. For example, for Git sources 154, the Git source archives may be accessed and used in a Git state process 168 to generate a command line(s) for the Git source archive in the command file 110. Similarly, for other source classes 156, a custom command line may be used with a custom template 170 to generate the corresponding information for the command file 110.

Figure 2:
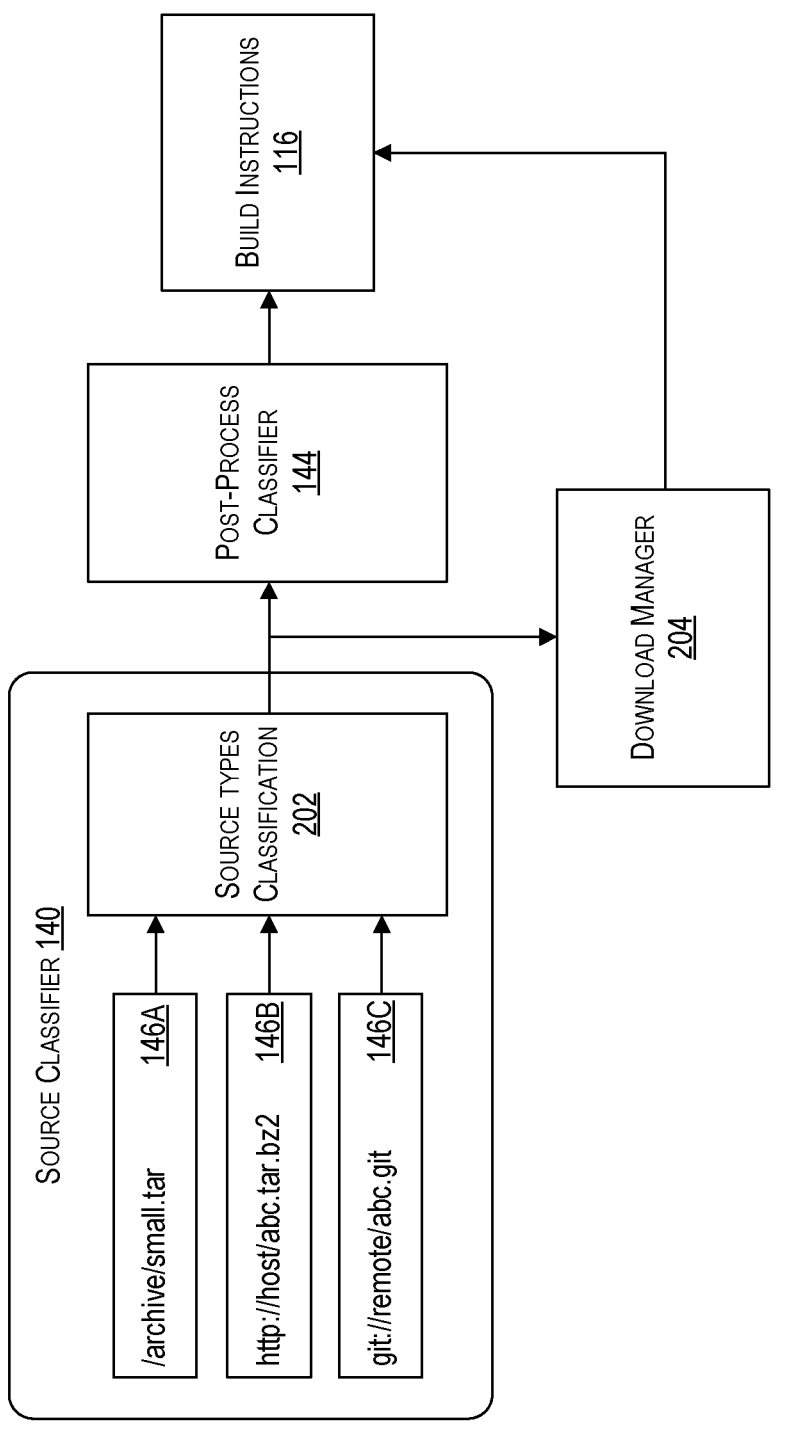
FIG. 2 illustrates a data flow diagram for source archive classification, in accordance with some embodiments of the present disclosure.

With reference to FIG. 2, the source classifier 140—e.g., after source type classification 202—may also determine the post-process type or classes using the post-process classifier 144. For example, the source archives may require decompression (e.g., to directly uncompress a .tar, .bz2, .zip, .gz, or other file type), installation (e.g., directly install a .deb, a .whl., or other file type), copy (e.g., directly copy), custom installation (e.g., using a user-defined command line), compilation (e.g., including a user-defined compile command line, or source code), and/or other post-process type operations. As such, this post-process type classification may be used to generate the build instructions 116 from the command file 110. The download manager 204 may be a component of the smart builder 106, and may be used to determine which download tactics to use—such as to perform native local copy operations or to perform HTTP auto copy download operations.

Figure 3:
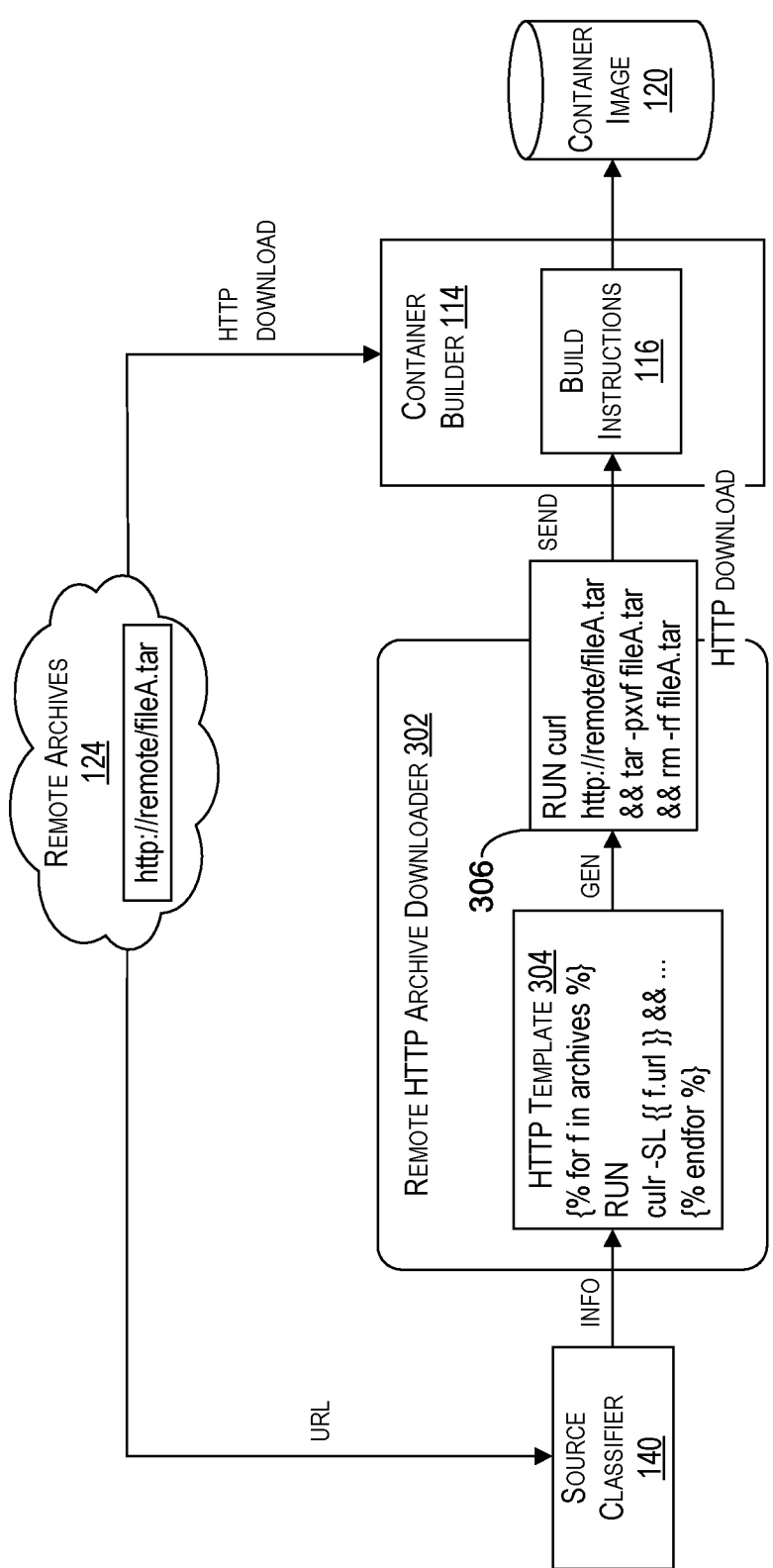
FIG. 3 illustrates a data flow diagram for remote archive source downloads, in accordance with some embodiments of the present disclosure.

For the remote HTTP archive class 148, an HTTP download 158 may be executed to retrieve the remote HTTP archive from the remote archives 124, and an HTTP generator 164—which may include an HTTP template 304 (FIG. 3)—may be used to generate a command line(s) corresponding to the remote archive 124 for inclusion in the command file 110. For example, with reference to FIG. 3, once the source classifier 140 classifies the remote source from the remote archives 124 as a remote HTTP archive, a remote HTTP archive downloader 302 may use an HTTP template 304 to generate a command line 306 that can be included in the command file 110 and used in build instructions 116 by a container builder 114 to generate an image layer(s) in the container image 120 corresponding to the remote archive 124. For example, the command line 306 may cause an HTTP download of the remote HTTP source file(s) that can be used by the container builder in generating the container image 120. The HTTP template 304, in embodiments, may include a template language or tool (e.g., Jinja, Jinja2, Django, etc.) that may generate HTTP run instructions for a command file 110. In some embodiments, the HTTP template 304 may support multiple URL downloads with each download via a single run instruction, or may support multiple URL downloads as a group download using a single run instruction. In addition, the HTTP template 304 may support custom processes after download, such as uncompress, install, etc.

Figure 4A:
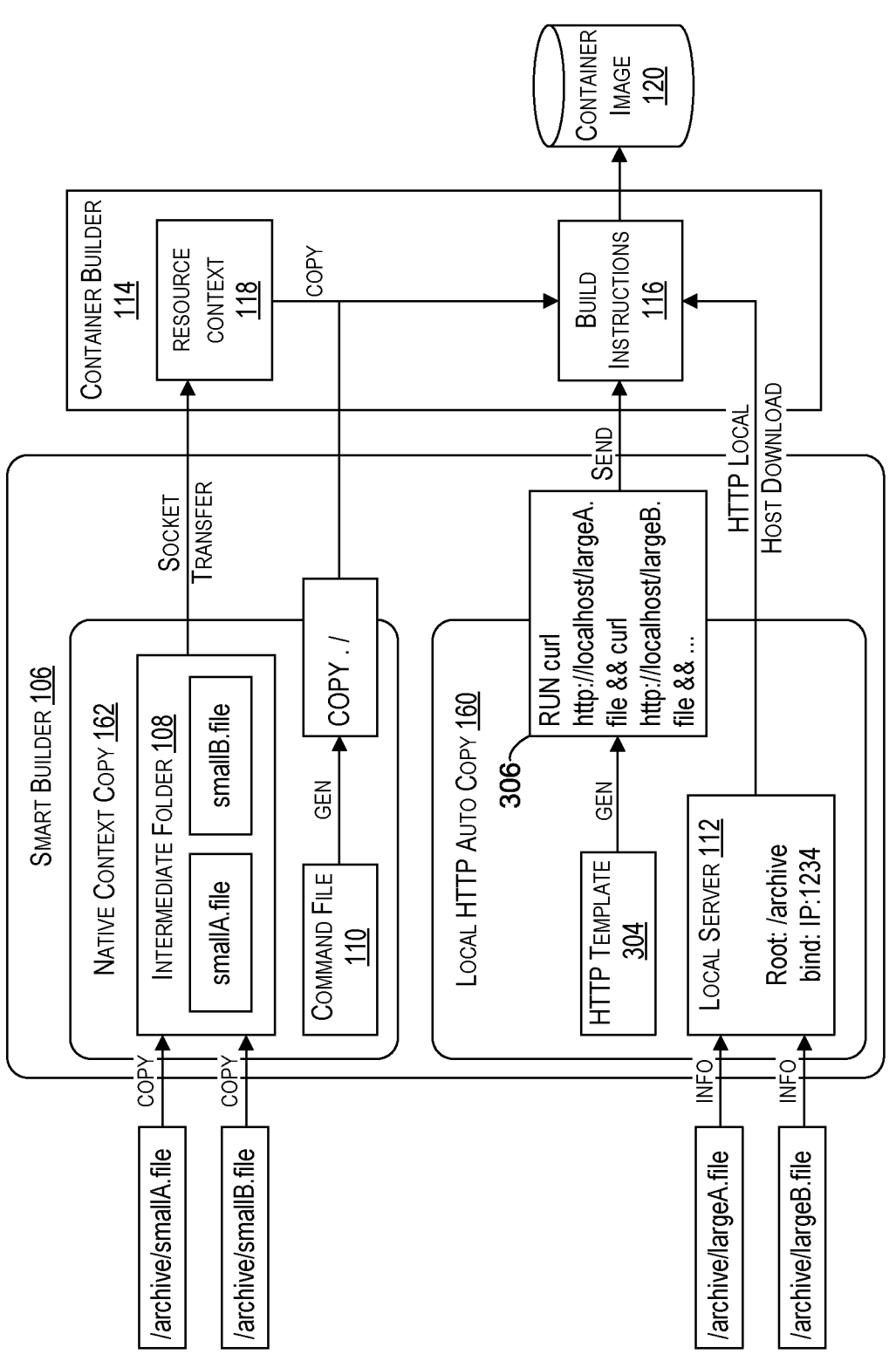
FIG. 4A illustrates a data flow diagram for building container images from local archives, in accordance with some embodiments of the present disclosure.

With reference to FIG. 4A, for local archives 152, the source classifier 140 may classify the local archives 152 as small or large (and/or additional or other classification types), depending on an associated file size. For example, the file size of the local source archives may be compared to a threshold value depending on the sub-class of the local source archive. As non-limiting examples, for compressed files, the threshold size may be 5 MB, for uncompressed or regular files, the threshold size may be 10 MB, and for folder or directories—e.g., that include one or more sub-files—the threshold size may be 10 MB. However, depending on the embodiment and the implementation, the threshold sizes may differ. For source archives that are greater in size than the threshold size, the source archives may undergo a local HTTP auto copy operation 160. For source archives that are less than the threshold size, the source archives may undergo a native context copy operation 162.

As such, the smart builder 106 may determine whether the local source archive file or folder/directory is small or large based on the comparison to the one or more associated thresholds corresponding to the local source sub-class (e.g., compressed, uncompressed, folder/directory, etc.). For small files, such as "/archive/smallA.file" and "/archive/smallB-.file," native context copy 162 may be executed. Where native context copy 162 is executed, an intermediate folder 108 may be used to store a copy of the small files as a build context. In addition, the command file 110 may include copy instructions for the container builder 114 to copy the small files from the intermediate folder 108 to the container builder 114 (e.g., using resource context 118), and the container builder 114 may use the build instructions 116 to again copy the small file now stored on the container builder 114. As such, where the files are small, the files may be copied three times—e.g., once from the source file location to the intermediate folder 108, once from the intermediate folder 108 to the container builder 114, and once from the container builder into the container image 120 using the build instructions 116. In embodiments, the copy of the small files from the intermediate folder 108 to the container builder 114 may be via a socket transfer (similar to that of the large source files from the local server 112 to the container builder 114). In addition, because the file is copied, the local context of the file may transferred to the container builder 114 and the whole context of the file may be maintained by the resource context 118. As such, the container builder 114 may use the command file 110 and the resource context 118 to build the layers of the container image 120 corresponding to the small files that undergo native context copy 162. The build layers may thus include a full context copy layer, which may reserve all permissions, result in a command file 110 that is clear and easy to read and/or debug, and allow for the build layer to be cached for an accelerated next build.

Figure 4B:
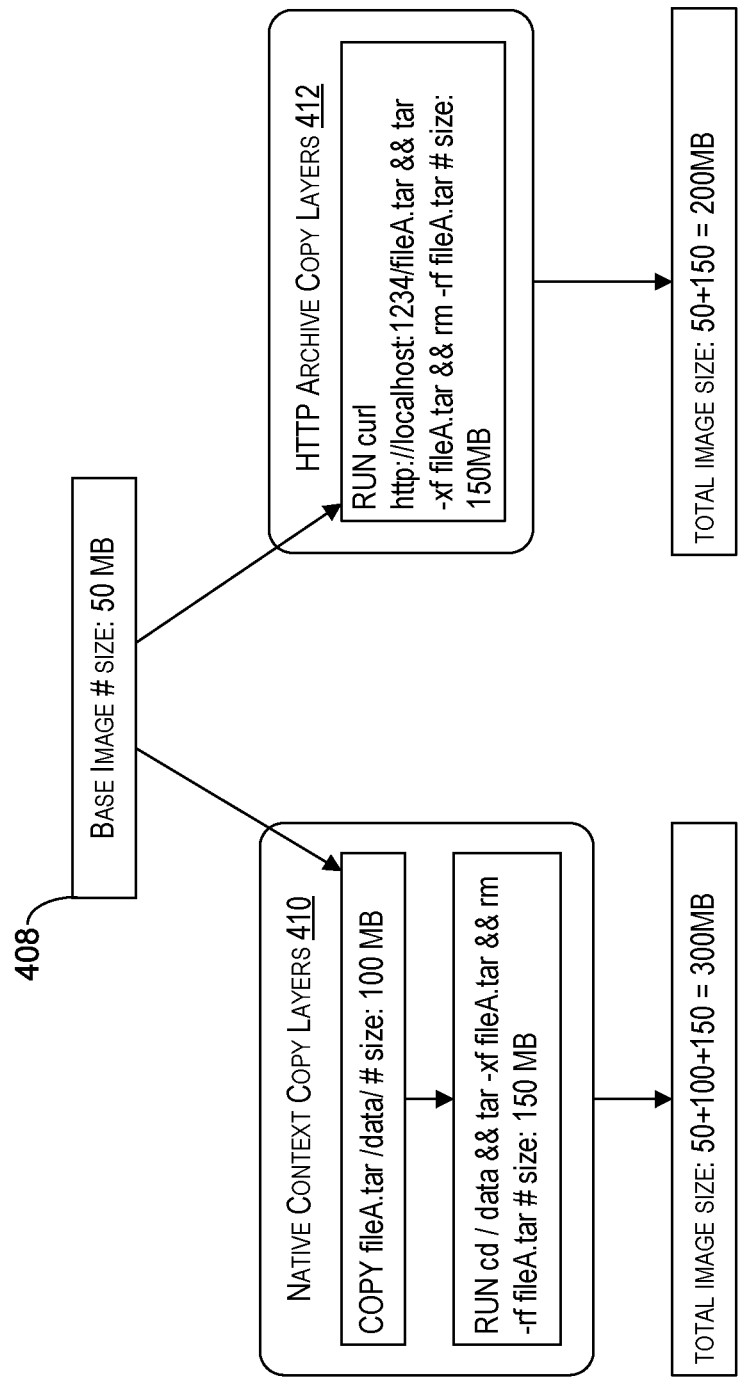
FIG. 4B illustrates image layers and associated sizes for different local archive classification types, in accordance with some embodiments of the present disclosure.

To account for the multiple copies using native context copy 162, local HTTP auto copy 160 may be used in embodiments—e.g., where the local source archive file is greater than a threshold size—to reduce the copies to a single copy. For example, with reference to FIG. 4B, a comparison between container image sizes for layers using native context copy 162 and local HTTP auto copy 160 are illustrated. In such an example, a base image 408 may include a size of 50 MB, and the native context copy layers 410 may include both a copy layer at 100 MB and a run layer at 150 MB, for a total image size of 300 MB. In contrast, the HTTP archive copy layers 412 may include only a run layer at 150 MB, so the total image size may be 200 MB (e.g., 100 MB less than the native context copy layers 410). The reduced size may be a result of not requiring a separate copy layer to copy the file prior to the run command In addition, because the file is not copied to an intermediate folder 108, then copied to the container builder 114, and then copied into the container image 120, the amount of time in generating layers using local HTTP auto copy 160 may also be reduced. Thus, the size of the container image 120 may be reduced when using local HTTP auto copy 160 and the runtime of the container image 120 build may be reduced.

Referring again to FIG. 4A, for local source archive files that are greater than an associated threshold value, local HTTP auto copy 160 may be executed. For example, for "/archive/largeA.file" and "/archive/largeB.file", local HTTP auto copy 160 may be used to set up a local server 112 to host the source archive files. To extend the example, a common top level folder or user specified top level folder may be determined for the local archives, and the local (e.g., HTTP) server 112 may be set up on this folder. A specified IP address or port may be established for the folder, and the HTTP template 304 may be used to generate HTTP download instructions. Similar to the HTTP template 304 for remote archives, the HTTP template 304 may include download instructions for multiple files using a single run command for each file or a combined run command for two or more files. The HTTP URL address may be generated using the smart builder 106 according to the IP address or port. The HTTP URL may be included in the command line 306 and included in the command file 110, and the command line 306 may be included in the build instructions 116 and used by the container builder 114 to generate the container image 120 using HTTP local host download from the local server 112. As such, the container builder 114 may download or copy the file a single time from the local server 112 using the URL generated and included in the command line 306 from the HTTP template 304.

Figure 4C:
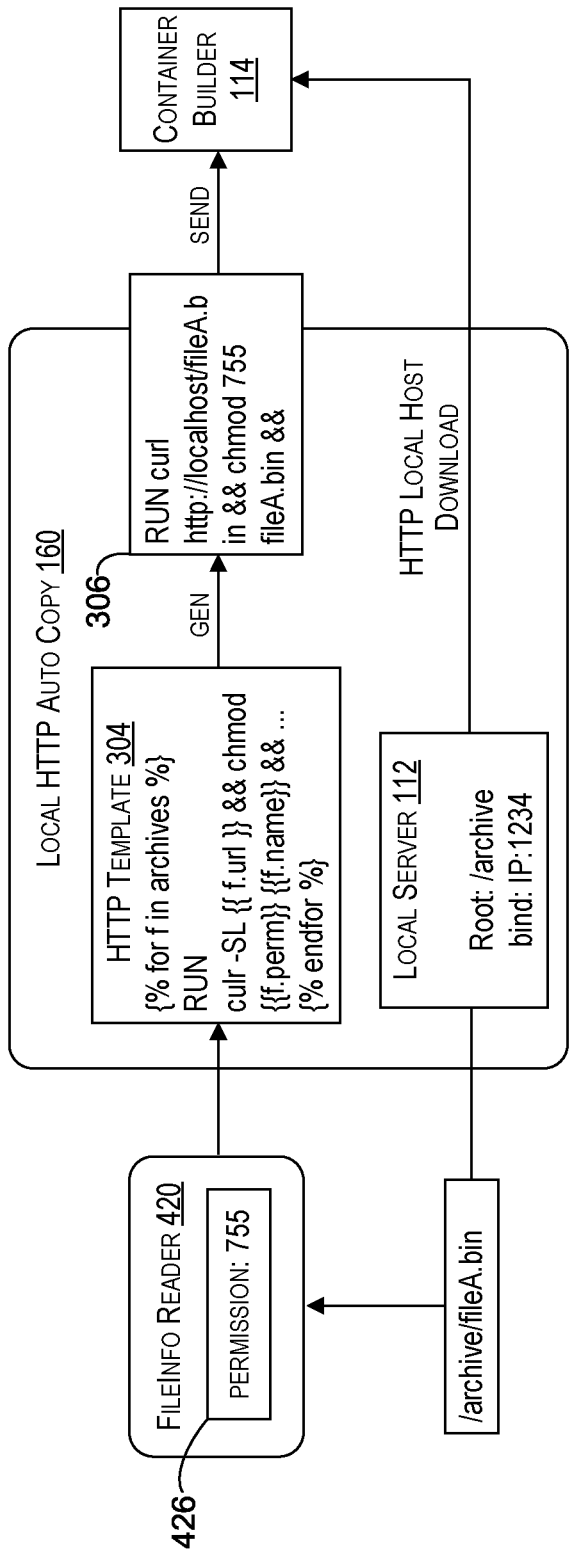
FIG. 4C illustrates a data flow diagram for preserving permissions information, in accordance with some embodiments of the present disclosure.

In embodiments, when using local HTTP auto copy 160, permissions information may be lost or not reserved—e.g., such as after a curl or wget operation. As such, and with reference to FIG. 4C, the HTTP template 304 may be updated to include permissions information in the command line instructions such that permissions may be restored to the local source file during the container build operations. As such, a fileinfo reader 420 may determine permissions 426 from the source file—such as "/archive.fileA.bin"—and the HTTP template 304 may include a command to include the instructions in the run command line. In the illustration of FIG. 4C, the {{f.perm}} in the HTTP template 304 may result in the permissions value "755" being included in the command line 306. In some embodiments, as described with respect to FIG. 5C, the permissions information may be included—e.g., using the fileinfo reader 420—in a metadata file 520 associated with the source archive file, and the HTTP template 304 may retrieve the permissions value from the metadata file 520 using the fileinfo reader 420.

Figure 5A:
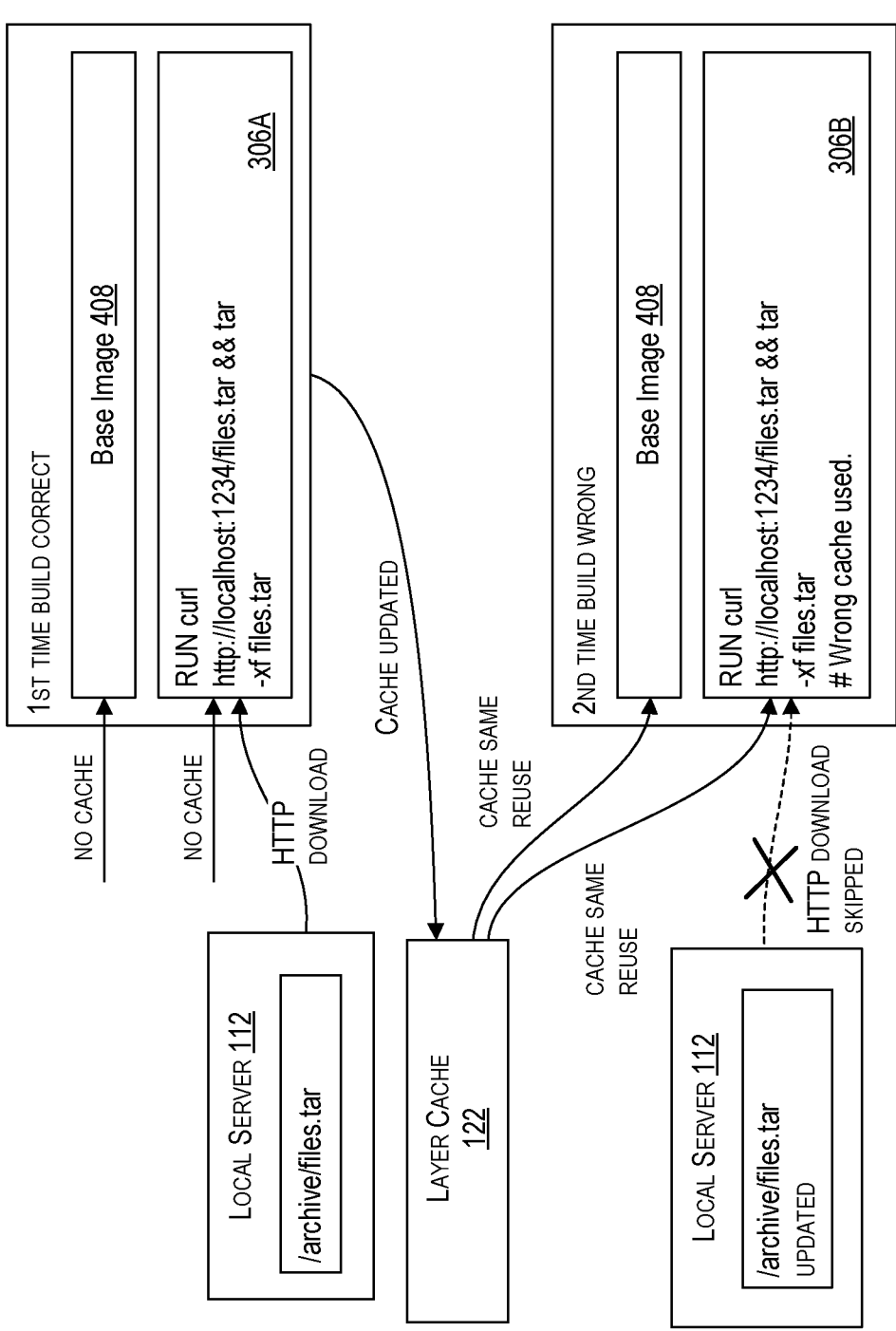
FIG. 5A illustrates improper cache layer reuse during container image build operations, in accordance with some embodiments of the present disclosure.
Figure 5B:
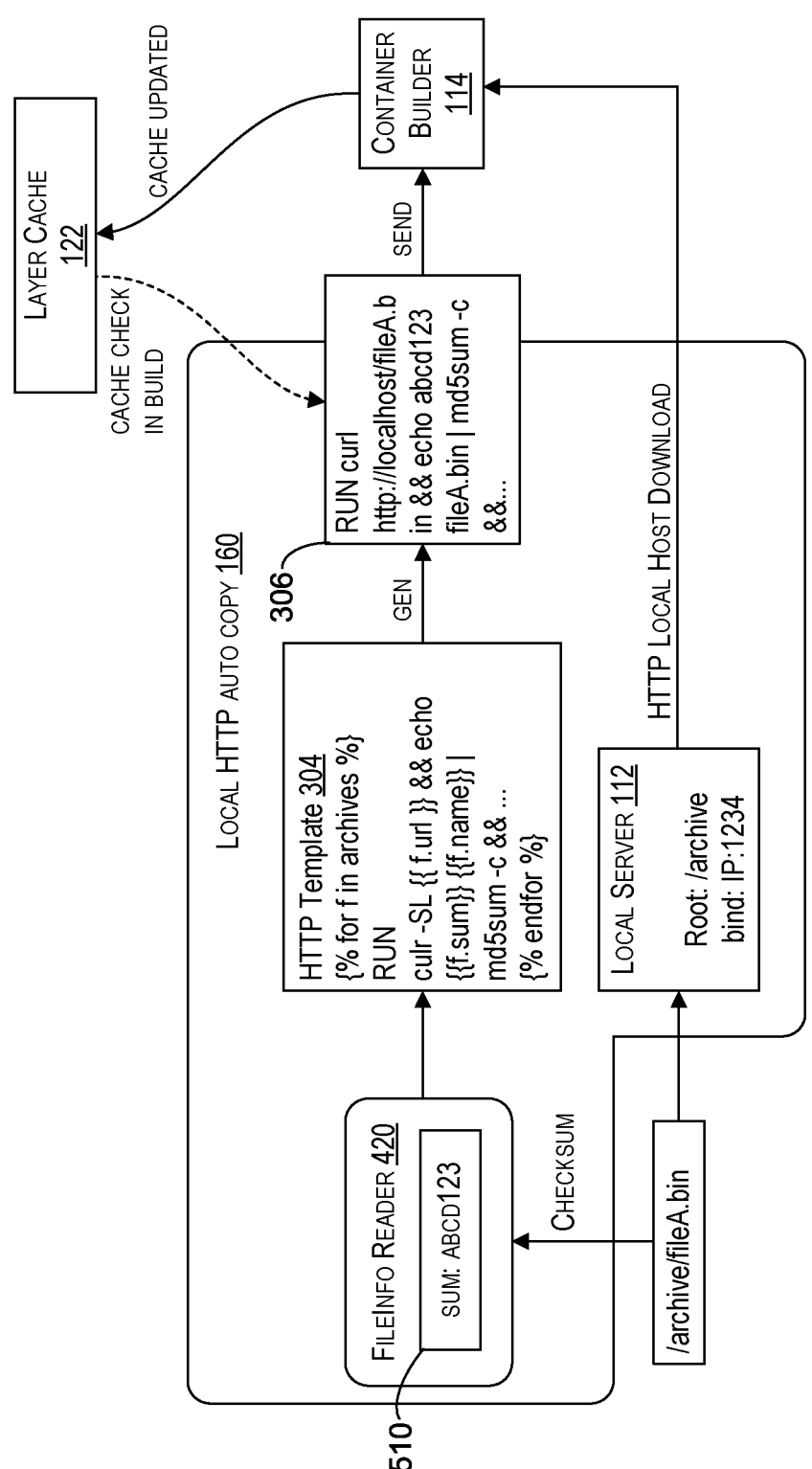
FIGS. 5B-5C illustrate data flow diagrams for solving cache layer reuse issues in container build operations, in accordance with some embodiments of the present disclosure.
Figure 5C:
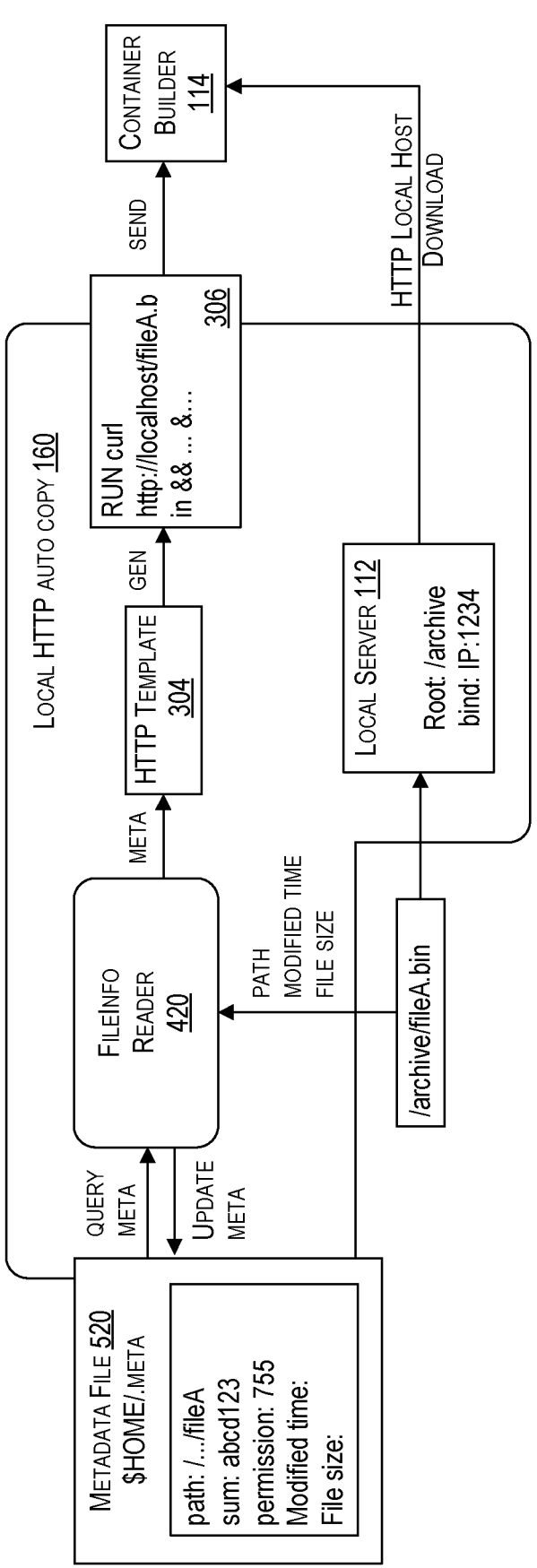

With reference to FIGS. 5A-5C, when using local HTTP auto copy 160, a layer cache 122 may be misused on subsequent container image builds when the source archive file is updated, modified, or otherwise changed. For example, because the determination of whether to generate a new layer or to use a cached layer in the container image 120 may be based on a comparison of command lines 306B corresponding to the file, a cached layer may be reused where the command line has not changed but the file itself has been updated. For example, in FIG. 5A, the command lines 306A and 306B may be identical, but the file "/archive/files.tar" may have been updated for the second build. As such, if no change is made, the layer cache 122 may be used and an improper image layer may be included in the container image 120. One approach to solving this issue is to disable the user of the layer cache 122. However, disabling the layer cache 122 may require a new layer be built each time, even where the layer cache 122 has the proper layer—e.g., such as where the source file has not been modified. As such, to account for the issue of improperly using a cache, while still allowing for the use of cache to speed up container image builds, the command line 306 may be updated—e.g., using a checksum value—to ensure that when a source archive file is updated or modified, the command line reflects this change. In such an example, where the command line has changed, the layer cache 122 may not be used as the command lines won't match, and an updated or new layer may be generated to account for the change to the file.

For example, with reference to FIG. 5B, the fileinfo reader 420 may compute a checksum value—e.g., using md5sum, sha256sum, and/or another checksum method—and the HTTP template 304 may include the checksum value such that the command line 306 includes the checksum value. As illustrated in FIG. 5B, {{fsum} } in the HTTP template 304 may be used to include the checksum value 510 "abcd123" in the command line 306. As such, when the command line 306 is sent to the container builder 114, the command line 306 may include the checksum value 510 corresponding to the current local source archive file, and can be compared against the command line 306 associated with the layer in the layer cache 122 (which includes the checksum value corresponding to stored local source archive file). Where the command lines match, the layer may be reused from the layer cache 122, and where the command lines do not match, a new layer may be generated using the updated or modified local source archive file. Where a new layer is generated, the layer cache 122 may be updated to include the new layer for a next build, where the process may repeat itself. Furthermore, the checksum value 510 in the command line 306 can verify whether the updated or modified local source archive file is correct.

To calculate the checksum value 510 at any given iteration, an extra data read of the file may be required. To account for this, as illustrated in FIG. 5C, a checksum being computed at each iteration may be avoided by using a metadata file 520. For example, a file path, modified time, and/or file size of a current file may be compared against metadata file 520 corresponding to stored information for the file to determine whether the file has changed. The metadata file 520 may include a dictionary or database with file information corresponding to the file, such as a file path (e.g., full path of local files, including a unique name as a key), file permissions, checksum value(s), last modified time, file size, and/or other information. In some examples, the fileinfo reader 420 may be used to maintain the metadata file 520 corresponding to the file, and to query the metadata file 520 to determine whether any changes to the file have been made. The information in the metadata file 520 may be stored in a key-value based format, in embodiments, such as in a YAML, ProtoBuf, MongoDB, and/or other format. In such examples, the file path may corresponding to the key, and the modified time and/or file size may correspond to the value(s). As such, prior to updating a checksum value for a file, the modified time and/or the file size may be compared for a file with the same file path. Where the modified time and/or the file size have not changed, the file may be determined not to have changed, and no new checksum value may be computed—thereby saving an extra read of the file. Where the modified time and/or the file size have changed, a new checksum value may be computed and used to update the metadata file 520 with the new checksum value for the file path. In addition, the permissions data may be included in the metadata file 520. As such, the HTTP template 304 may use the fileinfo reader 420 to retrieve the various data that is to be included in the command line 306, such as the checksum value (which is re-computed at iterations where a file change is detected), a permissions value, and/or other information. In this way, the command lines 306 may be updated where there is a file change or update, such that the layer cache 122 is not improperly used, and an extra read of the file to compute an updated checksum may be avoided at build iterations where no file change is detected.

Figure 6:
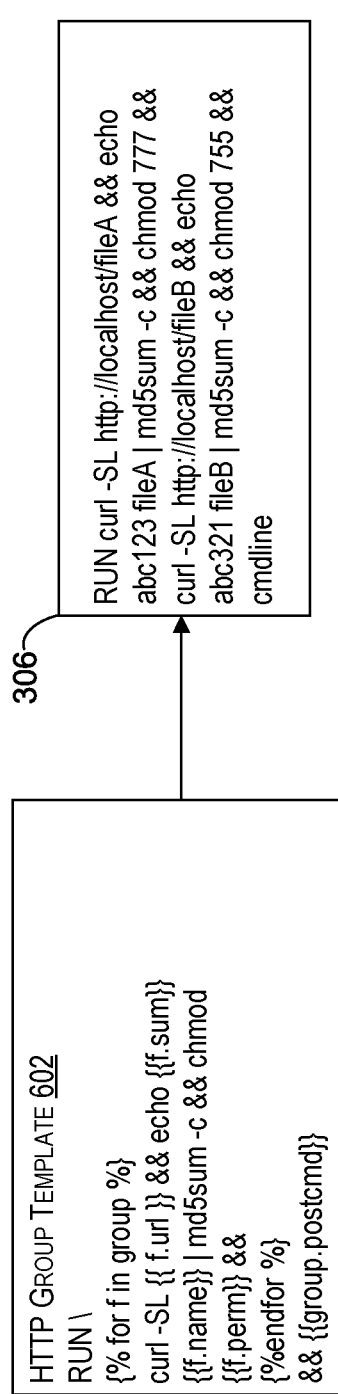
FIG. 6 illustrates an example HTTP template and corresponding command line for folders or directories, in accordance with some embodiments of the present disclosure.

In some embodiments, and with reference to FIG. 6, local HTTP auto copy 160 may be executed on folder or directories that include multiple sub-files. For example, a folder may be split into multiple files by the fileinfo reader 420, and the metadata files 520 for each file within the folder may be managed similarly to a single file. However, each file within the folder or directory may be marked or labeled as corresponding to a same group, and an HTTP group template 602 may support group downloads of multiple files using a single run instruction or command line 306. For example, as illustrated in FIG. 6, for a source archive "/data/folder" that includes two folders "/data/folder/fileA" and "/data/folder/fileB," the fileinfo reader 420 may update and/or check the two files individually—e.g., to update checksums, permissions, etc.—and the HTTP group template 602 may be used to convert a multi-download folder or directory into a single line instruction—e.g., command line 306 of FIG. 6. As such, each sub-file in the folder or directory may include permissions information (e.g., "777" for fileA and "755" for file B), checksum values (e.g., "abc123" for file A and "abc321" for file B), and/or other information such that a single layer may be built from a single instruction with multiple downloads, and/or a cached layer(s) from the layer cache 122 may be used where the files have not changed. By using group downloads, less layers may be required in the final container image 120 as compared to prior approaches where each individual file within the folder or directory would require separate command lines and corresponding layers.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the system 100 of FIGS. 1A-1B. However, this method 700 may additionally or alternatively be executed by any one system, or any combination of systems, including, but not limited to, those described herein.

FIG. 7 illustrates a flow diagram for a method 700 of source archive layer generation for container images, in accordance with some embodiments of the present disclosure The method 700, at block B702, includes determining, based at least on a comparison of a source archive file to a threshold size, that the source archive file has a size greater than the threshold size. For example, the source classifier 140 may determine the file type of the source archive file 146 and, for local sources 150, the local source 150 may be compared against an associated threshold file size. The associated threshold size may be determined based on a sub-class of the local source 150, such as a compressed file, an uncompressed file, a folder/directory, and/or another sub-class.

The method 700, at block B704, includes, based at least on the size being greater than the threshold size, configuring a local HTTP server to host the source archive file. For example, based on the local source 150 being greater in size than the associated threshold size, local HTTP auto copy 160 may be executed to generate a local server 112 for the file.

The method 700, at block B706, includes generating, using an HTTP template, a command line to access the source archive file from the local HTTP server. For example, the HTTP template 304 may be used to retrieve the necessary information—e.g., from a metadata file 520—to generate a command line 306 that may be used by a container builder 114 to access and download the local source archive hosted by the local server 112.

The method 700, at block B708, includes sending the command line to a container builder to cause the container builder to generate a container image using the source archive file. For example, the command line 306 may be included in the command file 110 and used in the build instructions 116 by the container builder 114 to generate the container image 120. The container image 120 may include the data from the source archive, after downloading the file using the local server 112.

Example Computing Device

Figure 8:
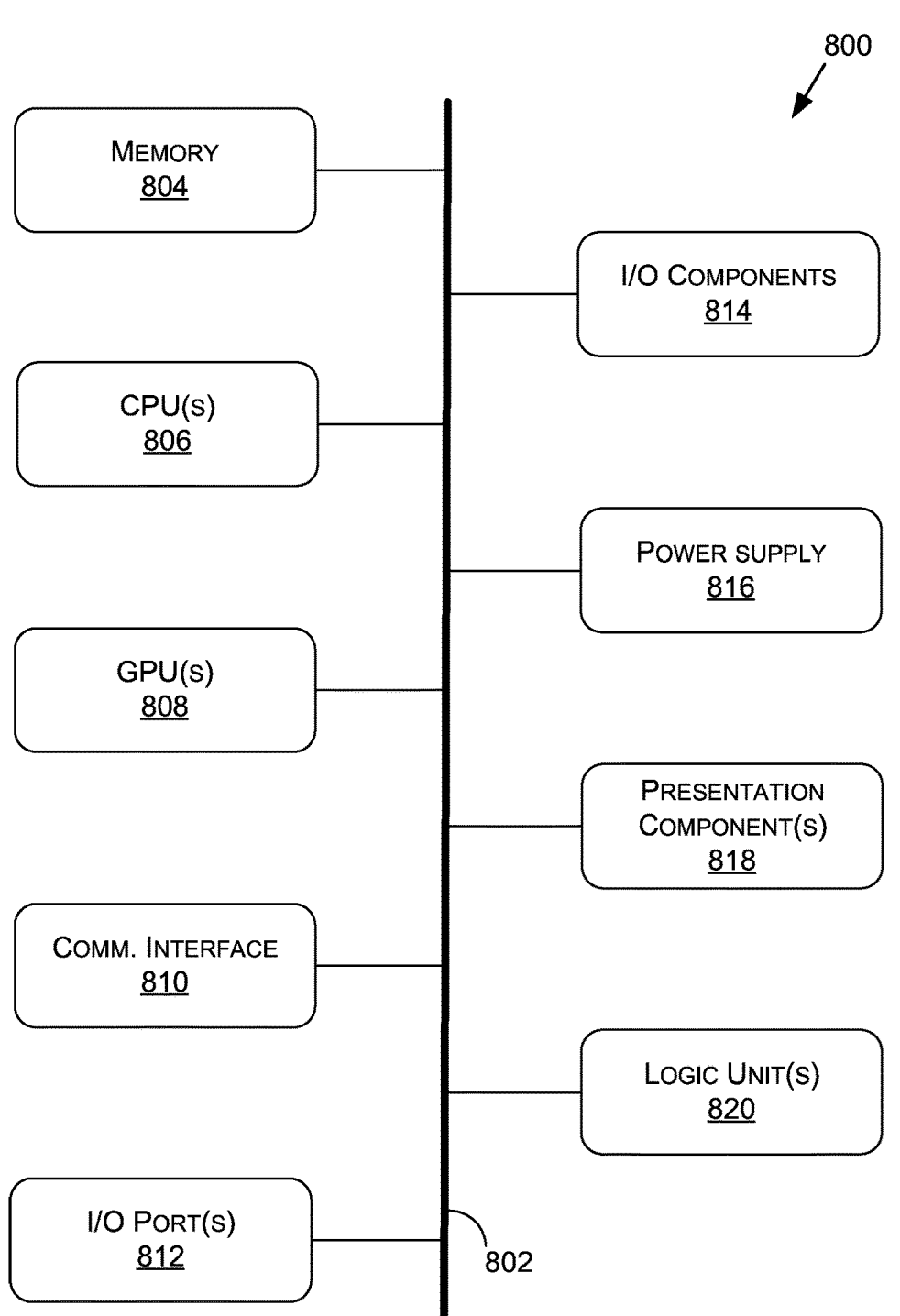
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
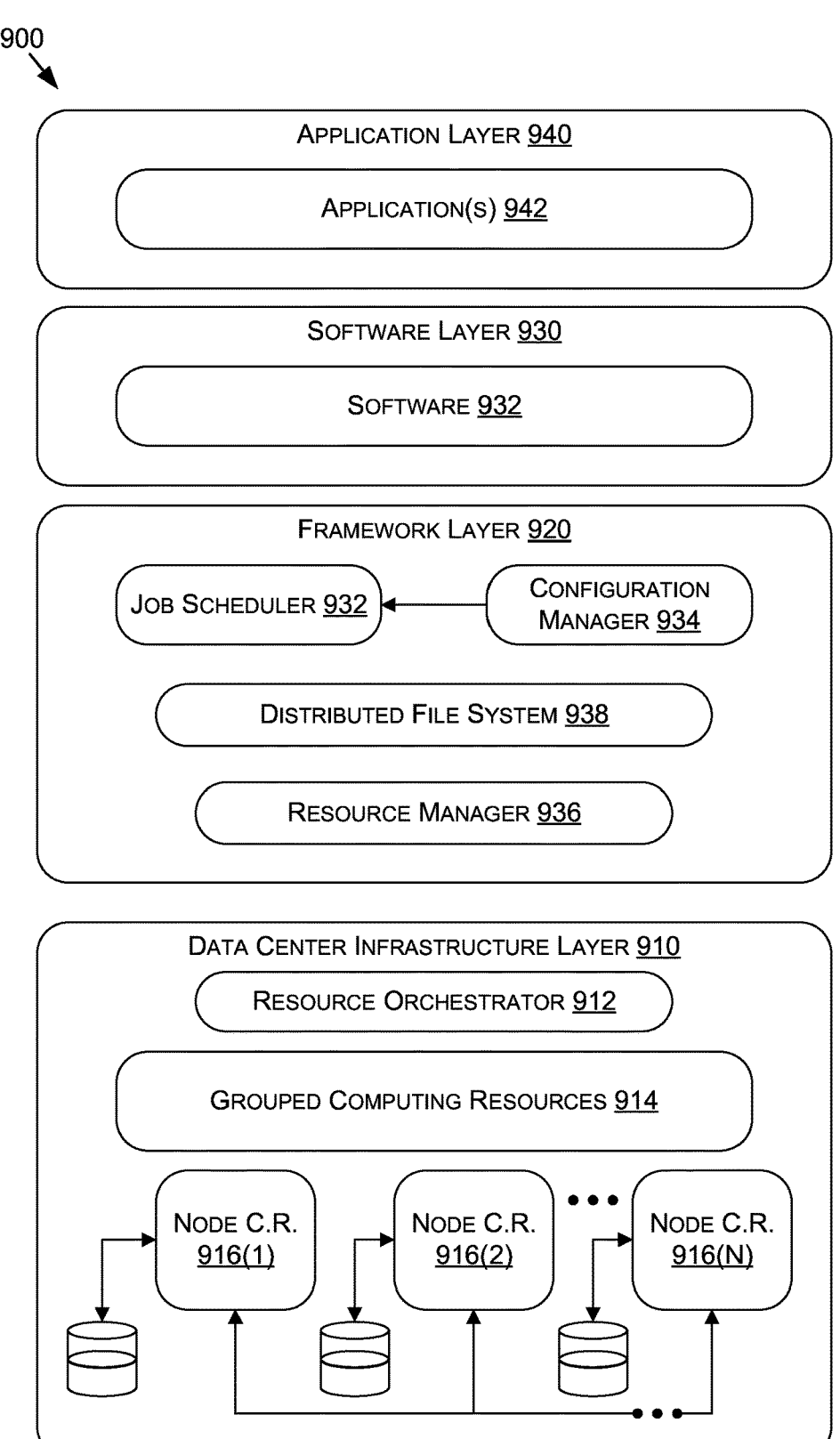
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
   one or more circuits to:
   classify a source file that is to be used to generate a container image;
   based at least on the source file being classified as a local source file, determine whether the source file has a size greater than a threshold size, the threshold size based at least on one or more characteristics associated with a secondary classification of the source file;

based at least on a determination that the size of the source file is greater than the threshold size, configure a local HTTP server to provide access to the source file at a network address;
   generate one or more command lines that are executable to cause the source file to be retrieved from the local HTTP server using the network address; and
   send the one or more command lines to a container builder to cause the container builder to generate the container image using the source file retrieved from the network address.

2. The at least one processor of claim 1, further comprising one or more circuits to:
   determine, for another source file, that a respective size of the another source file is less than the threshold size;
   copy the another source file to an intermediate work folder based at least on the respective size of the another source file being less than the threshold size;
   generate another command line to copy the another source file from the intermediate work folder; and
   send the another command line and the another source file from the intermediate work folder to the container builder such that the container builder further uses the another command line and the another source file to generate the container image.

3. The at least one processor of claim 1, further comprising one or more circuits to classify a plurality of source files into respective source types, the source types including at least one of a local source archive type, a remote source archive type, a Git source archive type, or a custom source archive type.

4. The at least one processor of claim 1, wherein the one or more circuits are further to, based at least on the size of the source file being greater than the threshold size, exclude the source file from a set of source files included in staging storage allocated to the container builder, the set of source files accessed by the container builder from the staging storage to build the container image.

5. The at least one processor of claim 1, further comprising processing circuitry to:
   determine permissions data corresponding to the source file; and
   store the permissions data;
   wherein the one or more command lines are generated using an HTTP template configured to cause the permissions data to be retrieved for inclusion in the one or more command lines.

6. The at least one processor of claim 5, further comprising processing circuitry to:
   compute a checksum value corresponding to the source file during a first build of the container image;
   compare at least one of a current size or a current update time corresponding to the source file to a stored size or a stored update time corresponding to the source file; and
   perform one of:
   updating the checksum value corresponding to the source file for a second build based at least on at least one of the current size being greater than the stored size or the current update time being different from the stored update time; or
   maintaining the checksum value corresponding to the source file for the second build based at least on at least one of the current size being equal to the stored size or the current update time being equal to the stored update time, wherein the HTTP template is configured to include the checksum value in the one or more command lines.

7. The at least one processor of claim 6, wherein the checksum value, the stored size, and the stored update time are included in a metadata file corresponding to the source file.

8. The at least one processor of claim 6, further comprising processing circuitry to, during the second build, use at least one cache layer generated during the first build and corresponding to the source file when the checksum value is maintained.

9. The at least one processor of claim 6, the one or more processors further to:

receive a configuration file that includes user identified source archives for inclusion in a container build operation that corresponds to the container image, the user identified source archives including the source file, wherein the classification of the source file is based at least on the receipt of the configuration file.

10. The at least one processor of claim 1, wherein the source file corresponds to a folder including a plurality of files, the plurality of files are labeled as a group, and the one or more command lines include a single command line for the folder such that each of the plurality of files are included in the container image using the single command line.

11. The at least one processor of claim 10, wherein the single command line corresponds to a single layer in the container image.

12. The at least one processor of claim 1, wherein the processor is comprised in at least one of:

a system for performing simulation operations;

a system for performing deep learning operations;

a system implemented using an edge device;

a system incorporating one or more virtual machines (VMs);

a system implemented at least partially in a data center; or a system implemented at least partially using cloud computing resources.

13. A system comprising:

one or more processing units; and one or more memory units storing instructions that, when executed by the one or more processing units, cause the one or more processing units to execute operations comprising:

classifying a source archive file based at least on one or more attributes associated with the source archive file;

based at least on the source archive file being classified as a local file, determining, based at least on comparing the source archive file to a threshold size, that the source archive file has a size greater than the threshold size;

configuring, based at least on the size being greater than the threshold size, a local HTTP server to provide access to the source archive file at a network address;

generating one or more command lines that are executable to cause the source archive file to be retrieved from the local HTTP server using the network address; and sending the one or more command lines to a container builder to cause the container builder to generate a container image using the source archive file retrieved from the network address.

14. The system of claim 13, wherein the operations further comprise:

determining, for another source archive file, that a respective size of the another source archive file is less than the threshold size;

copying, based at least on the respective size being less than the threshold size, the another source archive file to an intermediate work folder;

generating another command line to copy the another source archive file from the intermediate work folder; and sending the another command line and the another source archive file from the intermediate work folder to the container builder such that the container builder further uses the another command line and the another source archive file to generate the container image.

15. The system of claim 13, wherein the operations further comprise classifying a plurality of source archive files into respective source archive types, the source archive types including at least one of a local source archive type, a remote source archive type, a Git source archive type, or a custom source archive type.

16. The system of claim 13, wherein the operations further comprise:

determining permissions data corresponding to the source archive file; and storing the permissions data;

wherein the generating the one or more command lines comprises using an HTTP template configured to cause the permissions data to be retrieved for inclusion in the one or more command lines.

17. The system of claim 16, wherein the operations further comprise:

computing a checksum value corresponding to the source archive file during a first build of the container image;

comparing at least one of a current size or a current update time corresponding to the source archive file to a stored size or a stored update time corresponding to the source archive file; and performing one of:

updating the checksum value corresponding to the source archive file for a second build based at least on at least one of the current size being greater than the stored size or the current update time being different from the stored update time; or maintaining the checksum value corresponding to the source archive file for the second build based at least on at least one of the current size being equal to the stored size or the current update time being equal to the stored update time, wherein the HTTP template is configured to include the checksum value in the one or more command lines.

18. The system of claim 17, wherein the checksum value, the stored size, and the stored update time are included in a metadata file corresponding to the source archive file.

19. The system of claim 13, wherein the system is comprised in at least one of:

a system for performing simulation operations;

a system for performing deep learning operations;

a system implemented using an edge device;

a system incorporating one or more virtual machines (VMs);

a system implemented at least partially in a data center; or a system implemented at least partially using cloud computing resources.

20. A method comprising:

classifying a source archive file based at least on one or more attributes associated with the source archive file;

based at least on the source archive file being classified as a local file, determining, based at least on comparing the source archive file to a threshold size, that the source archive file has a size greater than the threshold size;

configuring, based at least on the size being greater than the threshold size, a local HTTP server to provide access to the source file at a network address;

generating, using an HTTP template, one or more command lines that are executable to cause the source archive file to be retrieved from the local HTTP server using the network address; and sending the one or more command lines to a container builder to cause the container builder to generate a container image using the source archive file retrieved from the network address.

21. The method of claim 20, further comprising:

determining, for another source archive file, that a respective size of the another source archive file is less than the threshold size;

based at least on the respective size being less than the threshold size, copying the another source archive file to an intermediate work folder;

generating another command line to copy the another source archive file from the intermediate work folder; and sending the another command line and the another source archive file from the intermediate work folder to the container builder such that the container builder further uses the another command line and the another source archive file to generate the container image.

22. The method of claim 20, further comprising classifying a plurality of source archive files into respective source archive types, the source archive types including at least one of a local source archive type, a remote source archive type, a Git source archive type, or a custom source archive type.

23. The method of claim 20, further comprising:

determining permissions data corresponding to the source archive file; and storing the permissions data;

wherein the HTTP template is configured to cause the permissions data to be retrieved for inclusion in the one or more command lines.

24. The method of claim 20, further comprising:

computing a checksum value corresponding to the source archive file during a first build of the container image;

comparing at least one of a current size or a current update time corresponding to the source archive file to a stored size or a stored update time corresponding to the source archive file; and performing one of:

updating the checksum value corresponding to the source archive file for a second build based at least on at least one of the current size being greater than the stored size or the current update time being different from the stored update time; or maintaining the checksum value corresponding to the source archive file for the second build based at least on at least one of the current size being equal to the stored size or the current update time being equal to the stored update time, wherein the HTTP template is configured to include the checksum value in the one or more command lines.

25. The method of claim 24, wherein the checksum value, the stored size, and the stored update time are included in a metadata file corresponding to the source archive file.

26. The method of claim 24, wherein the checksum value, the stored size, the stored update time are included in a metadata file in a key-value format, the metadata file associated with the source archive file.

* * * * *